US012524623B2

(12) United States Patent
Dhotre et al.

(10) Patent No.: US 12,524,623 B2
(45) Date of Patent: Jan. 13, 2026

(54) EXTENSIBLE DIGITAL ASSISTANT INTERFACE USING NATURAL LANGUAGE PROCESSING TO RESPOND TO USER INTENT

(71) Applicant: Target Brands, Inc., Minneapolis, MN (US)

(72) Inventors: Kiran Dhotre, Minneapolis, MN (US); Aswin Kumar, Karnataka (IN); Gayathri Kushalappa, Shoreview, MN (US)

(73) Assignee: Target Brands, Inc., Minneapolis, MN (US)

( * ) Notice: Subject to any disclaimer, the term of this patent is extended or adjusted under 35 U.S.C. 154(b) by 1004 days.

(21) Appl. No.: 17/576,541

(22) Filed: Jan. 14, 2022

(65) Prior Publication Data

US 2023/0229865 A1 Jul. 20, 2023

(51) Int. Cl.
*G06F 40/40* (2020.01)
*G06F 16/2452* (2019.01)
*G06F 16/3329* (2025.01)
*G06F 16/9032* (2019.01)
*G06F 40/35* (2020.01)
*G06N 5/043* (2023.01)
(Continued)

(52) U.S. Cl.
CPC ........ *G06F 40/40* (2020.01); *G06F 16/24522* (2019.01); *G06F 16/3329* (2019.01); *G06F 16/90332* (2019.01); *G06F 40/35* (2020.01); *G06N 5/043* (2013.01); *G06F 40/284* (2020.01); *G06N 20/00* (2019.01); *H04L 51/02* (2013.01)

(58) Field of Classification Search
CPC .... G06F 40/40; G06F 40/35; G06F 16/24522; G06F 16/3329; G06F 16/90332; G06F 40/284; G06N 5/043; G06N 20/00; H04L 51/02
USPC ............................................................ 704/9
See application file for complete search history.

(56) References Cited

U.S. PATENT DOCUMENTS 7,249,019 B2 * 7/2007 Culy ........................ G10L 15/18
704/235
8,135,576 B2 * 3/2012 Haley ..................... G06F 40/30
704/4
(Continued)

OTHER PUBLICATIONS

Microsoft Azure: Introduction to Bot Framework Composer, Dec. 2020, 257 Pages.
(Continued)

*Primary Examiner* — Edwin S Leland, III
(74) *Attorney, Agent, or Firm* — Merchant & Gould P.C.

(57) ABSTRACT

A platform, method, and system for a digital assistant are disclosed. The digital assistant uses natural language processing to respond to user queries. The digital assistant is extensible, because it can interface with a variety of devices, with a variety of natural language understanding providers, and with a variety of handlers. One method includes receiving a query from a user device, standardizing the query, and transmitting it to one of a plurality of natural language understanding providers. The digital assistant then receives intent data related to the intent of the query. The digital assistant then transmits the intent data to one of a plurality of handlers. The handler processes the intent data and returns content to the digital assistant. The digital assistant then adapts the content and sends it to the user device.

19 Claims, 11 Drawing Sheets

(51) Int. Cl.
  *G06F 40/284* (2020.01)
  *G06N 20/00* (2019.01)
  *H04L 51/02* (2022.01)

(56) References Cited

U.S. PATENT DOCUMENTS

| | | | | |
|---|---|---|---|---|
| 8,200,608 | B2* | 6/2012 | Au | G06F 16/3344 |
| | | | | 707/763 |
| 8,326,634 | B2* | 12/2012 | Di Cristo | G06F 16/3329 |
| | | | | 704/270.1 |
| 8,731,929 | B2* | 5/2014 | Kennewick | G10L 15/1822 |
| | | | | 704/270.1 |
| 9,378,740 | B1* | 6/2016 | Rosen | G10L 15/1822 |
| 9,959,129 | B2* | 5/2018 | Kannan | G10L 15/22 |
| 10,096,316 | B2* | 10/2018 | Kalns | G10L 15/18 |
| 10,108,603 | B2* | 10/2018 | Lavallee | G06F 40/211 |
| 10,127,224 | B2* | 11/2018 | Deleeuw | G06F 16/90332 |
| 10,186,254 | B2* | 1/2019 | Williams | G10L 15/04 |
| 10,235,996 | B2* | 3/2019 | Renard | G06F 3/167 |
| 10,270,862 | B1* | 4/2019 | Cheng | G06F 16/951 |
| 10,417,345 | B1* | 9/2019 | Carlson | G06F 40/30 |
| 11,295,735 | B1* | 4/2022 | Anuar | G10L 15/30 |
| 2017/0140285 | A1* | 5/2017 | Dotan-Cohen | G06F 3/01 |
| 2020/0302936 | A1* | 9/2020 | Abu Asba | G10L 15/30 |
| 2021/0249002 | A1* | 8/2021 | Ahmadidaneshashtiani | |
| | | | | G06F 40/284 |
| 2023/0196033 | A1* | 6/2023 | Robert Jose | G06F 40/30 |
| | | | | 704/9 |
| 2023/0229865 | A1* | 7/2023 | Dhotre | G06F 16/24522 |
| | | | | 704/9 |

OTHER PUBLICATIONS

Kumar et al., Just ASK: Building an Architecture for Extensible Self-Service Spoken Language Understanding, Nov. 2017, 13 Pages.

* cited by examiner

802a | 802b | 802c
↓ | ↓ | ↓
"Browse large garbage bags." | "Show me big garbage bags on Target.com." | "Search for garbage bags, large."

FIG. 8

INTENT DATA 804

Intents 806: "product search"

Entities 808:
Product Category: "cleaning supplies";
Product Type: "garbage bags";
Size: "large";
Brand: unknown.

← 800

CONTENT 810

Opening Response: "Here are four products that might interest you."
Voice Response: Yes
Visual Display Response: No
Enriched Content:
    Name: "Extra-Strong Large Drawstring Trash Bags – 30 gallon"
    Price: $15.99
    Count: 72
    Brand: Up & Up Name: "Glad Large Drawstring Trash Bags – 30 Gallon"
    Price: $16.99
    Count: 68
    Brand: Glad Name: "Hefty Ultra Strong Fabuloso 30 Gallon Trash Bags"
    Price: $9.99
    Count: 34
    Brand: Hefty Name: "Heavy-Duty Contractor Trash Bags 45 Gallon";
    Price: $9.99
    Count: 24
    Brand: Up & Up Follow-up Response: "Do you want to add a product to your cart?"

EXTENSIBLE DIGITAL ASSISTANT INTERFACE USING NATURAL LANGUAGE PROCESSING TO RESPOND TO USER INTENT

BACKGROUND

There are various ways that a user can digitally interact with a particular entity. For example, in an online retail context, to browse or purchase products, a customer can search with text or by selecting categories on a website or application. To perform other actions, such as to check the status of an order, view account information, or ask questions, there are specialized services, available on a limited number of devices, that are available to a customer.

Such a piecemeal system with separate services for interactions between retailers and customers has drawbacks. When customers interact with a retailer, they must direct themselves to the appropriate digital service for the task, and they must be using a device and type of communication supported by the retailer. During this process, customers may fail to find the service they are seeking, give up searching for a service, or select the wrong service. For instance, a customer may attempt, in vain, to use a product search service to view account information; or a customer may try, again in vain, to order a product from a retailer using a smart device not supported by the retailer. Although digital assistants exist to alleviate these issues, present digital assistants are limited. Chat bots, for example, are often limited to text-based communication and are only available on certain platforms. And general smart devices, such as Google Home, are not specific to retail and do not alone perform all the digital services offered by retailers.

One issue with present digital retail assistants and services offered by retailers is that they are not well equipped to receive natural language queries. Each service is equipped to handle tasks within its domain, whether it be, for example, to assist the customer to browse products or to respond to a customer's inquiry about a recent order. As a result of this specialization, the services are generally not able to understand, process, and accurately respond to general natural language queries, leaving customers without a way to direct a general natural language query at a retailer's digital services. A further limitation caused by the inability to handle general natural language queries is that the services are not easily extensible to voice-based smart devices, which customers may try to use to interact with a retailer.

Another issue with present digital retail assistants and services is that they do not provide a unified experience. The services are separate, and the digital assistants do not adequately integrate them. Customers may have the perception that they are interacting with different retailers when they use different digital services from the same retailer. For example, the customer's experience when viewing an order status may have a different feel than the customer's experience when canceling an order. Or the customer's experience may largely vary depending on the customer's device. Present digital assistants and services are, in a word, disjointed, and this is a disadvantage for customers expecting, and retailers wanting to provide, a uniform digital retail experience.

SUMMARY

In general, the subject matter of the present invention relates to a digital assistant platform that uses natural language processing to respond to queries. More specifically, the present invention relates to a digital assistant platform that integrates a plurality of natural language understanding (NLU) providers, adapters, an orchestrator, and handlers. Furthermore, the digital assistant platform is extensible, thereby allowing it to interact with a variety of devices, leverage a variety of NLU providers to understand user intent, and use a variety of handlers to provide content that is responsive to user intent.

In an example aspect, a digital assistant platform comprises a processing unit and a memory communicatively connected to the processing unit, the memory storing instructions executable by the processing unit wherein the instructions, when executed, cause the digital assistant platform to: receive a query from a user device; transform, using an adapter, the query into a standardized query; transmit the standardized query to a natural language understanding service for submission to at least one of a plurality of natural language understanding providers; receive intent data from the natural language understanding service, the intent data being provided by a selected natural language understanding provider of the plurality of natural language understanding providers; transmit the intent data to a handler selected from among a plurality of handlers; receive responsive content from the selected handler; transmit the responsive content to the adapter; transform the responsive content, using the adapter, to adapted responsive content; and transmit the adapted responsive content to the user device.

In a second aspect, a method of operating a digital assistant platform comprises: receiving a query from a user device; transforming, using an adapter, the query into a standardized query; transmitting the standardized query to a natural language understanding service for submission to at least one of a plurality of natural language understanding providers; receiving intent data from the natural language understanding service, the intent data being provided by a selected natural language understanding provider of the plurality of natural language understanding providers; transmitting the intent data to a handler selected from among a plurality of handlers; receiving responsive content from the selected handler; transmitting the responsive content to the adapter; transforming the responsive content, using the adapter, to adapted responsive content; and transmitting the adapted responsive content to the user device.

In a third aspect, a digital assistant system comprises: a plurality of adapters configured to receive a query and to standardize the query; a natural language understanding service configured to provide structured intent data, wherein the natural language understanding service comprises a natural language understanding provider selector communicatively coupled with a plurality of natural language understanding providers; a plurality of handlers; and an orchestrator communicatively connected to the plurality of adapters, to the natural language understanding service, and to the plurality of handlers. The orchestrator is configured to: receive a standardized query; transmit the standardized query to the natural language understanding service; receive intent data from the natural language understanding service; transmit the intent data, via intent routers, to a selected handler of the plurality of handlers; receive responsive content, via the intent routers, from the selected handler; and transmit the responsive content to at least one of the adapters of the plurality of adapters.

BRIEF DESCRIPTION OF THE DRAWINGS

FIG. 8 illustrates an example of queries, intent data, and content.

DETAILED DESCRIPTION

Figure 1:
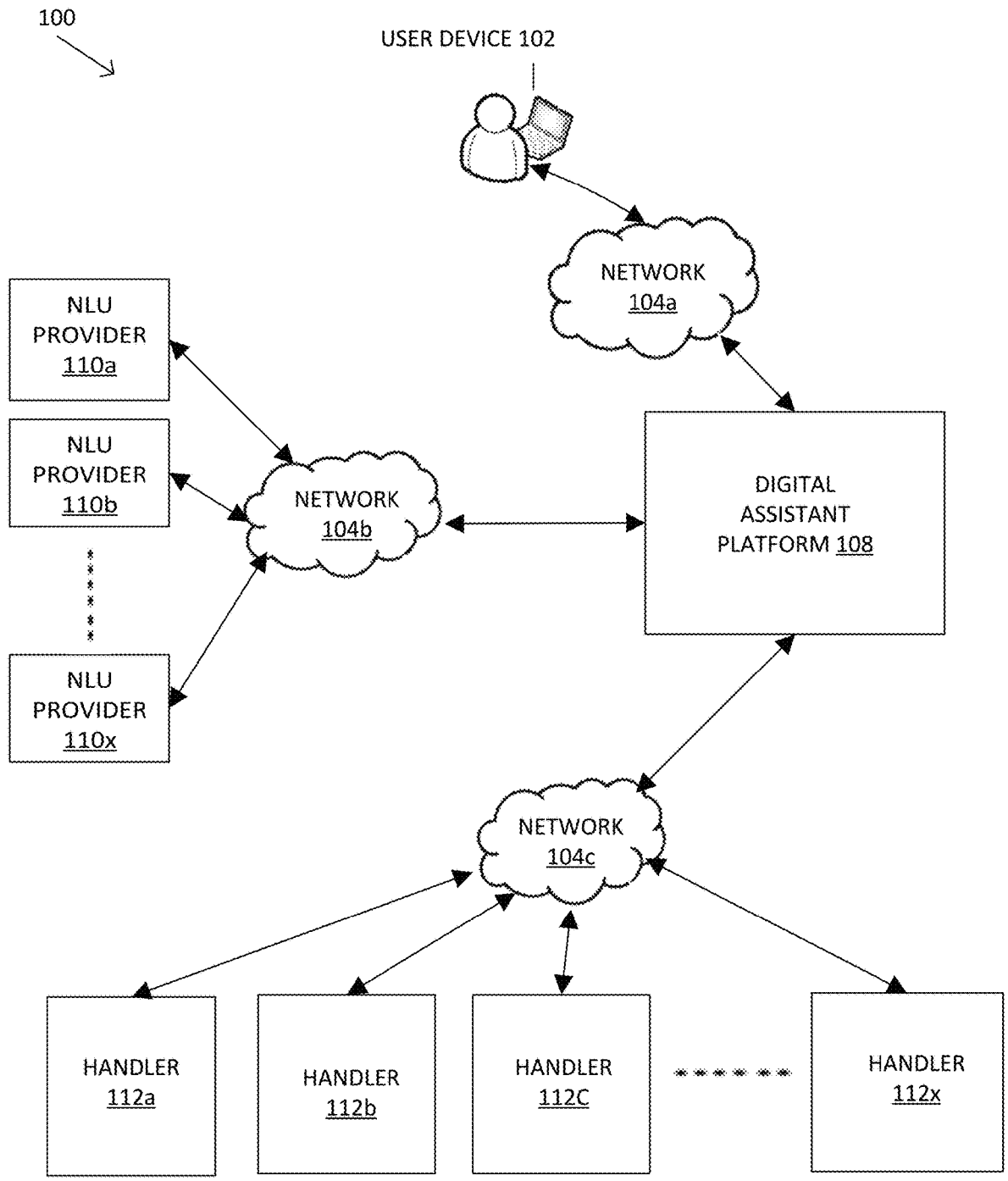
FIG. 1 illustrates a network in which aspects of the present disclosure can be implemented.

As briefly discussed above, embodiments of the present disclosure are directed to a digital assistant platform that provides content that is responsive to user intent.

In example aspects, the platform may be configured to receive a natural language query. The platform uses adapters to receive the query, and the adapters standardize the query. Then the adapters pass the standardized query to an orchestrator. Once the orchestrator receives the standardized query, the orchestrator transmits the standardized query to an NLU provider selector. The NLU provider selector is communicatively connected to a plurality of NLU providers. Each NLU provider can receive a natural language query, process the query, and output structured intent data. The intent data can include one or more intents associated with the query, along with attributes of the one or more intents.

In example aspects, the NLU provider selector is extensible. That is, the NLU provider selector can connect with any and all NLU providers. Because of the NLU provider selector's extensibility, it is not dependent on any one NLU provider, and it can connect to more NLU providers, which may be better suited for certain queries. In other words, the NLU provider selector can seamlessly connect to and use new or changed NLU providers; or conversely, the NLU provider selector can seamlessly disconnect with an NLU provider and rely instead on other NLU providers.

After receiving the standardized query, the NLU provider selector selects one of the NLU providers and transmits the query to it. In response, the NLU provider selector receives intent data from the selected NLU provider. The NLU provider selector then sends the intent data to the orchestrator. Once the orchestrator receives the intent data from the NLU provider selector, the orchestrator can transmit the intent data to intent routers.

In example aspects, the intent routers can read the intent of the intent data and then pass the intent data to a handler associated with that intent. The intent routers are extensible. That is, the intent routers can connect to more or fewer handlers. For example, if a new handler is needed, based on business or technical needs, or as users expect more functionality from the digital assistant platform, then the new handler can register the intent that it is designed to handle, and it can connect with the intent routers. Similarly, existing handlers can be modified or removed, and the intent routers can accommodate these changes.

After the handler receives the intent data, the handler processes the intent data. After processing the intent data, the handler returns responsive content to the intent routers. The responsive content is then received by the intent routers and passed to the orchestrator. Next the orchestrator transmits the responsive content to the adapters. The adapters receive the responsive content and transform it to fit the user's device. The adapters then transmit the transformed responsive content to the user's device.

Referring now to FIG. 1, an example digital assistant network environment 100 is shown in which aspects of the present disclosure may be implemented. In the example shown, the digital assistant network environment 100 includes a digital assistant platform 108. As further described below in connection with FIG. 11, the digital assistant platform can be implemented in a computing environment, such as the computing environment 1102. The digital assistant network environment 100 further includes networks 104a-c. Each network of networks 104a-c can be, for example, a wireless network, a wired network, a virtual network, the Internet, or any other type of network. Furthermore, each network of the networks 104a-c can be divided into subnetworks, and the subnetworks can be different types of networks or the same type of network.

The digital assistant network environment 100 further includes a user device 102. The user device 102 is communicatively coupled, via the network 104a, to the digital assistant platform 108. The user device 102 is further described below in connection with FIG. 3. The digital assistant network environment 100 further includes natural language understanding (NLU) providers 110a-c communicatively coupled, via the network 104b, to the digital assistant platform 108. The NLU providers 110a-x are further described below in connection with FIG. 4. The digital assistant network environment 100 further includes handlers 112a-x communicatively coupled, via the network 104c, to the digital assistant platform 108. The handlers 112a-x are further described below in connection with FIG. 5.

Figure 2:
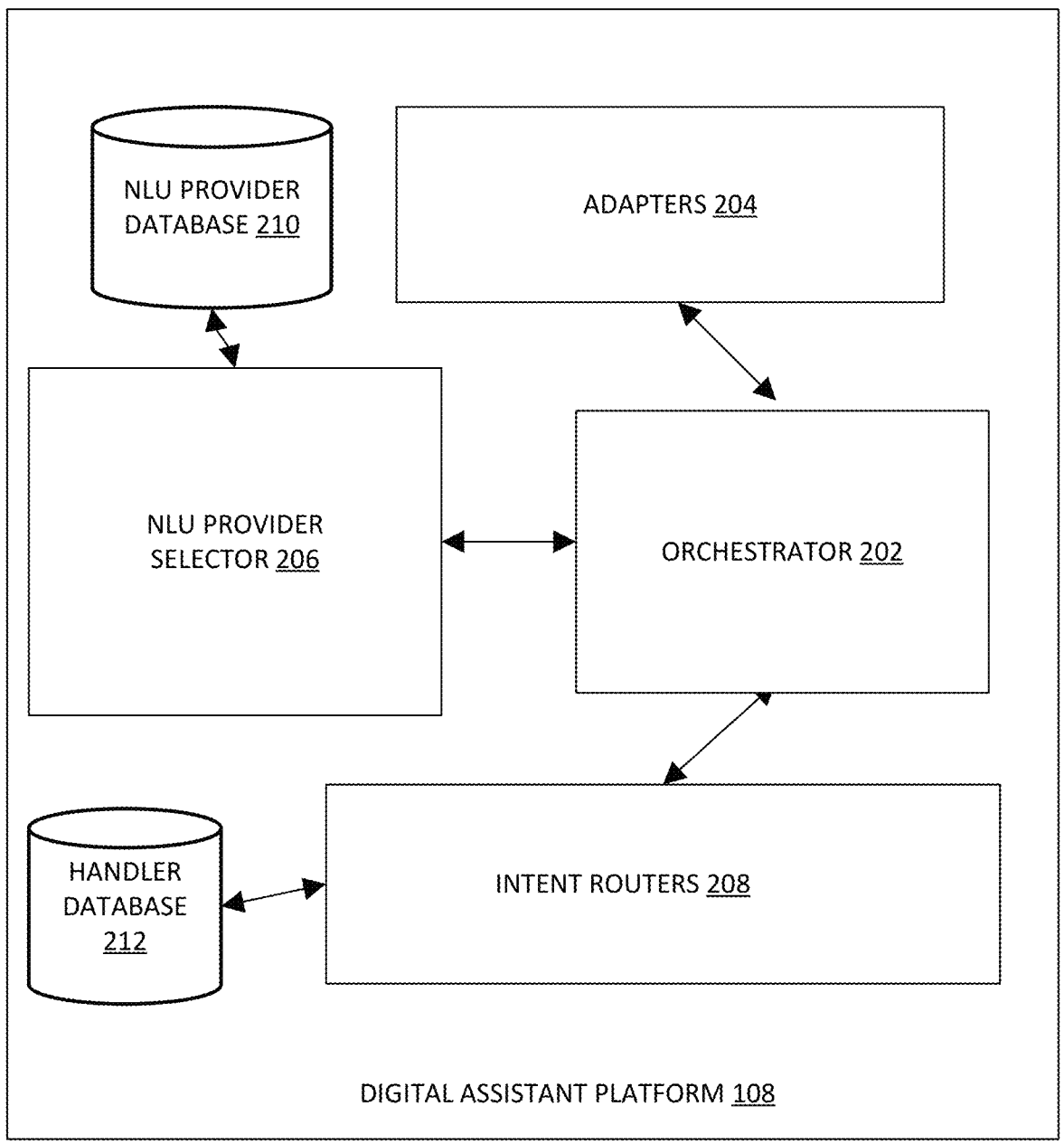
FIG. 2 is a block diagram of a digital assistant platform, according to an example embodiment of the present disclosure.

FIG. 2 illustrates example components of the digital assistant platform 108. In particular, FIG. 2 illustrates how components of the digital assistant platform 108 can be communicatively coupled. The components of the digital assistant platform 108 include an orchestrator 202, adapters 204, an NLU provider selector 206, intent routers 208, an NLU provider database 210, and a handler database 212. In one example, the components of the digital assistant platform 108 can be implemented in the same computing environment, such as computing environment 1102 described in connection with FIG. 11. In other examples, any one or more of the orchestrator 202, the adapters 204, the NLU provider selector 206, the intent routers 208, the NLU provider database 210, and the handler database 212 can be implemented in a different computing environment.

In the example of FIG. 2, the adapters 204 are communicatively coupled to the orchestrator 202. The NLU provider selector 206 is communicatively coupled to the orchestrator 202 and to the NLU provider database 210. The intent routers 208 are communicatively coupled to the orchestrator 202 and to the handler database 212. In other examples, the components of the digital assistant platform 108 can be communicatively coupled in different ways. In one example, each of the orchestrator 202, the adapters 204, the NLU provider selector 206, the intent routers 208, the NLU provider database 210, and the handler database 212 can be communicatively coupled with every other component of the digital assistant platform 108. In addition to the illustrated components, the digital assistant platform 108 can also include other components that are not illustrated, such as components for logging activity, addressing faults, or organizing communications among the components.

Figure 3:
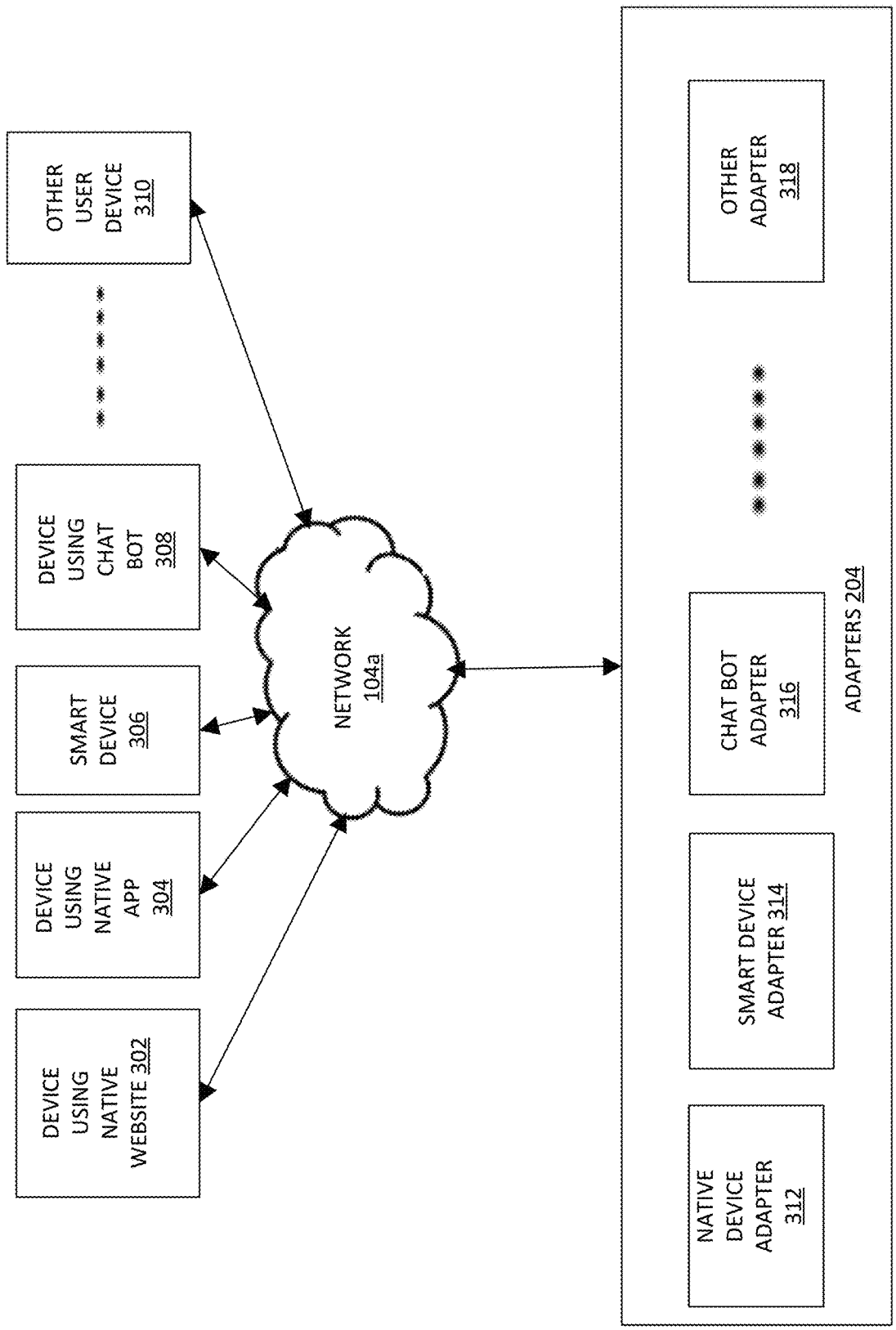
FIG. 3 illustrates example user devices and an example connection between user devices and the digital assistant platform.

FIG. 3 illustrates examples of the user device 102 and of the network 104*a* of FIG. 1. Furthermore, FIG. 3 illustrates an example of the adapters 204 of FIG. 2.

As illustrated in the example of FIG. 3, the user device 102 of FIG. 1 can be any of the devices 302-310. That is, the user device 102 can be a device using native website 302, a device using native app 304, a smart device 306, a device using chat bot 308, or another user device 310. The device using native website 302 can be, for example, a device that is using a website that is associated with the owner, creator, or affiliate of the digital assistant platform 108. The device using native app 304 can be, for example, a device that is using a mobile application that is associated with the owner, creator, or affiliate of the digital assistant platform 108. The smart device 306 can be, for example, Google Home, Amazon Alexa, Samsung Bixby, or any other smart device, including an Internet of things (IoT) device. The device using chat bot 308 can be any device, such as a computer or mobile phone, that is using a chat bot. The other user device 310 can be any device that can send a query, whether the query is a voice-based query or text-based query, to the digital assistant platform 108, via the network 104*a*. As illustrated by the other device 310, the user device 102 is not limited, in number or type, to devices 302-308.

The adapters 204 can include a plurality of adapters. In the example of FIG. 3, the adapters 204 include a native device adapter 312, a smart device adapter 314, a chat bot adapter 316, and another adapter 318. Each adapter of the adapters 204 can receive a query and standardize the query. Furthermore, each adapter of the adapters 204 can receive a different type of query, or a query from a different type of user device 102, and standardize the query. For example, the native device adapter 312 can receive and standardize a query sent from the device using native website 302 or the device using native app 304. The smart device adapter 314 can receive and standardize a query sent from the smart device 306. The chat bot adapter 316 can receive and standardize a query from the device using chat bot 308. The other adapter 318 can be any other adapter capable of receiving a query and standardizing the query. As illustrated by the other adapter 318, the adapters 204 are not limited, in number or type, to the adapters 312-316. Furthermore, the number of adapters included in the adapters 204 can be increased or decreased.

As illustrated in FIG. 3, and as further described below in connection with FIG. 6, the user device 102, whether it is the device using native website 302, the device using native app 304, the smart device 306, the device using chat bot 308, or the other user device 310, can send a query, via the network 104*a*, to the digital assistant platform 108. The query is received by the digital assistant platform 108 at the adapters 204. The adapters 204, whether it is the native device adapter 312, the smart device adapter 314, the chat bot adapter 316, or the other adapter 318, receive the query and standardize the query. After the adapters 204 standardize the query, the structure and form of the query are such, that its structure and form do not depend on the user device 102 that sends it.

Because the adapters 204 standardize queries, the digital assistant platform 108 can process queries in a uniform way, irrespective of the user device 102 that sends any particular query, and irrespective of whether a query is a text-based query or a voice-based query. This standardization can assist the digital assistant platform 108 to provide an integrated service across user devices.

Figure 4:
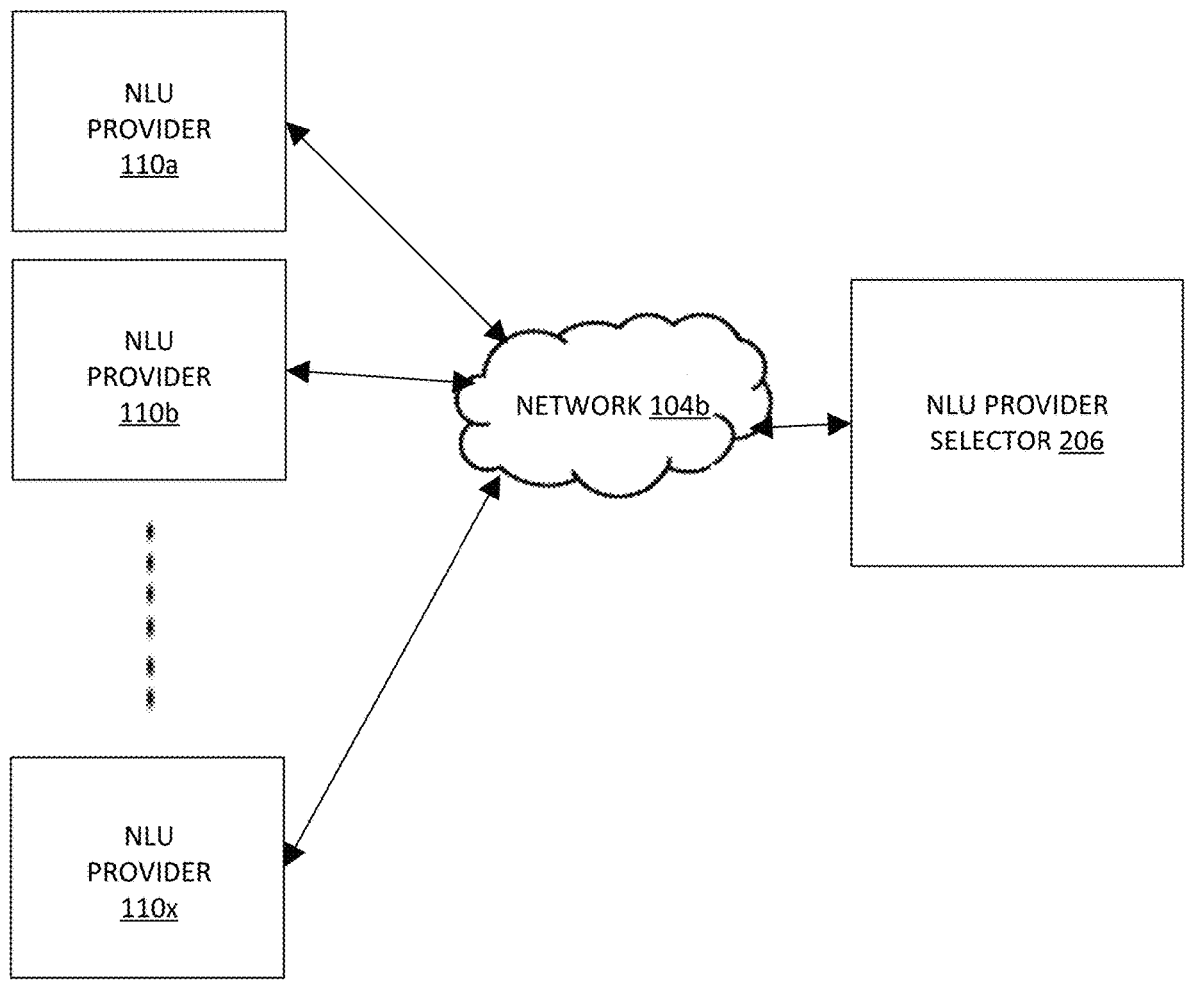
FIG. 4 illustrates NLU providers and an example connection between NLU providers and the digital assistant platform.

FIG. 4 illustrates an example of how the NLU providers 110*a-x* are communicatively coupled, via the network 104*b*, to the NLU provider selector 206 of the digital assistant platform 108.

Each NLU provider of the NLU providers 10*a-x* can receive query information and output intent data. As an example, the NLU provider 110*a* can receive a natural language query, and then the NLU provider 110*a* can, using a machine-learned model, process the natural language query. In processing the natural language query, the NLU provider 110*a* can discern one or more intents of the natural language query. Furthermore, in addition to discerning one or more intents of the natural language query, the NLU provider 110*a* can discern attributes of those intent. The NLU provider 110*a* can then structure and output intent data, which includes the one or more intents and the attributes of those intents. An example of intent data is example intent data 804 of FIG. 8, which is further described below. In one example, the NLU provider 110*a* can be a natural language understanding service such as Microsoft's LUIS.

NLU providers can differ from one another. One way that NLU providers can differ is that NLU providers can be trained to recognize different scopes of intents or different types of intents. For example, the NLU provider 110*a* can be trained to recognize a broad intent, whereas the NLU provider 110*b* can be trained recognize a narrower or domain-specific intent. Consequently, the NLU provider 110*a* might be more accurate than the NLU provider 110*b* at recognizing, for example, the intent of a more general or broader natural language query. And the NLU provider 110*b* might be more accurate than the NLU provider 110*a* at recognizing a narrower, more domain-specific intent of a natural language query.

For an example in the digital retail context, the NLU provider 110*a* can be trained to recognize a broad, functional intent of a natural language query. Consequently, the NLU provider 110*a* can recognize general intents such as "browse products," "find a store," or "view orders." The NLU provider 110*b*, on the other hand, can be trained to recognize an intent within a specific domain, such as a product search domain, the result being that the NLU provider 110*b* can recognize more specific intents, such as "search for women's shoes," "search for dog food," or "search for tennis balls." Thus, if the natural language query is "search for large bags of dog food," then the NLU provider 110*b* can recognize that an intent of the query is to search for dog food, whereas the NLU provider 110*a* can only recognize that an intent is to search for products. However, if the query is "schedule a pickup for dog food," then the NLU provider 110*b* may not return useful results, because it is not trained to recognize queries related to scheduling pickups. But the NLU provider 110*a* can recognize that a general intent of the query is, for example, "schedule pickup." In this and other ways, both within the retail context and beyond the retail context, one NLU provider can be better suited to understand a particular natural language query than another NLU provider, whereas the opposite can be true for a different natural language query.

As illustrated by an NLU provider 110*x*, there is no limit to the number or type of NLU providers that can belong to the NLU providers 110*a-x*. Furthermore, each NLU provider of the NLU providers 110*a-x* can be, but need not be, trained to recognize different types of intents or different scopes of intents.

The NLU provider selector 206, which is a component of the digital assistant platform 108, is communicatively connected to the NLU providers 110*a-x*. Additionally, as illustrated by the NLU provider 110*x*, the NLU provider selector 206 can communicatively connect with more NLU providers. That is, if, for example, there is a new NLU provider that does not belong to the NLU provider 110*a-x*, the new NLU provider can communicatively connect with the NLU provider selector 206, thereby becoming an NLU provider of the NLU providers 110*a-x*. In other words, the NLU provider selector 206 is extensible, allowing it to communicatively connect with any and all NLU providers. Furthermore, the NLU provider selector 206 can communicatively disconnect from one or more NLU providers of the NLU providers 110*a-x*. As such, the NLU provider selector 206 does not depend on any one NLU provider of the NLU providers 110*a-x*.

As further described below in connection with FIG. 6, the NLU provider 206 can send a natural language query to one or more NLU providers of the NLU providers 110*a-x*. In return, the NLU provider selector 206 can receive intent data from the one or more NLU providers of the NLU providers 110*a-x*.

An advantage of the present disclosure is that the NLU provider selector 206 can take advantage of the strengths of multiple NLU providers, thereby helping the digital assistant platform 108 to more accurately and more efficiently understand one or more intents and attributes of a natural language query. Another advantage is that the digital assistant platform 108 is not dependent on any one NLU provider, and the digital assistant platform 108 can communicatively connect to more or different NLU providers.

Figure 5:
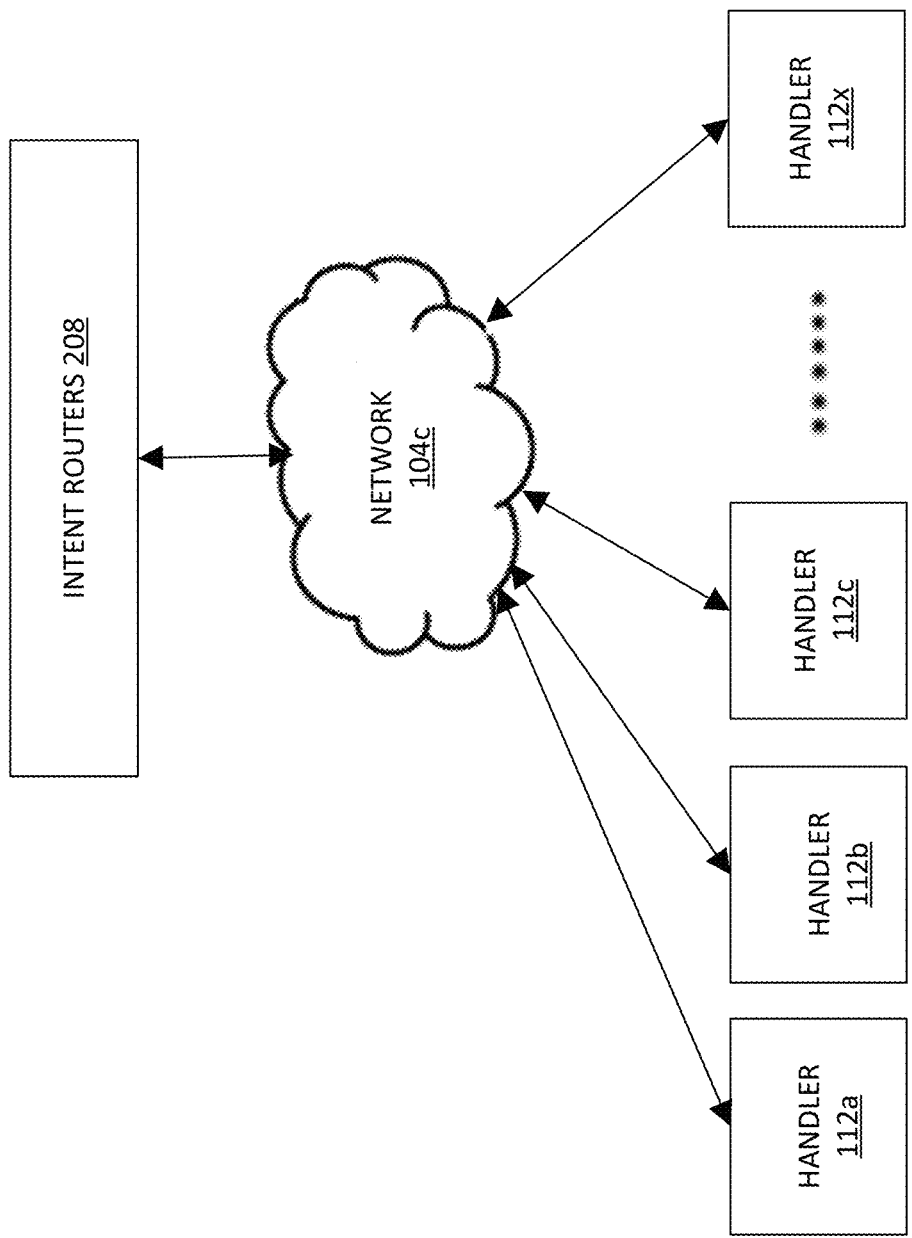
FIG. 5 illustrates example handlers and an example connection between handlers and the digital assistant platform.

FIG. 5 illustrates an example of how the plurality of handlers 112*a-x* are communicatively coupled, via the network 104*c*, to the intent routers 208.

Each handler of the handlers 112*a-x* can receive data from the intent routers 208 and return responsive content based on the data received from the intent routers 208. The responsive content can include a text response, a voice responses, a picture, a video, a button, a list, an emoji, a weblink, product information, any other enriched content, any other information or data related to the data received from the intent routers 208, or any combination thereof. Example responsive content 810 of FIG. 8, which is further described below, is an example of responsive content returned by a handler of the handlers 112*a-x*.

Each handler of handlers 112*a-x* can receive, process, and return data that is specific to a certain domain. For an example in the retail context, handler 112*a* can be a product search handler, handler 112*b* can be a view orders handler, and handler 112*c* can be a schedule pickup handler. Furthermore, each handler of the plurality of handlers can register one or more intents with the digital assistant platform 108. The one or more intents can be registered, for example, in the handler database 212. Continuing with the retail example, the handler 112*a* can register with the digital assistant platform 108 intents that relate to product searching, such as "product search," "search products," "browse products," or "find items."

As illustrated by handler 112*x*, the number or type of handlers of handlers 112*a-x* is not limited. Accordingly, more handlers can be communicatively connected to the intent routers 208, as is further explained below in connection with FIG. 7. Furthermore, the intent routers 208 can communicatively disconnect from one or more of the handlers of the handlers 112*a-x*.

As is further explained below in connection with FIG. 6, the intent routers 208 can receive data from the orchestrator 202. The data can include intent data, previous intent data, data related to the user device 102, and other data. The intent data can be, for example, example intent data 804 of FIG. 8. Like the example intent data 804, the intent data can include an intent. After receiving the data, the intent routers 208 can send the data to a handler of the handlers 112*a-x* that corresponds with the intent of the intent data. To find the handler that corresponds with that intent, the intent routers 208 can check the handler database 212 to determine which handler registered that intent.

Continuing the example in the retail context, if the intent routers 208 receive intent data with an intent of "browse products," then the intent routers 208 can send the data to the handler 112*a*, which, in this example, is a product search handler, and which registered the intent "browse products." After the intent routers 208 send the data, the handler 112*a* can receive the data, process it, and return content to the intent routers 208.

An advantage of certain embodiments of the present disclosure is that, in some instances, the digital assistant platform 108 can communicatively connect to new or changed handlers, and the digital assistant platform 108 can disconnect from handlers. Because the digital assistant platform 108 is extensible in this way, it can more easily integrate new and different functionality, and it can provide content that better responds to the intent of the user.

Figure 6:
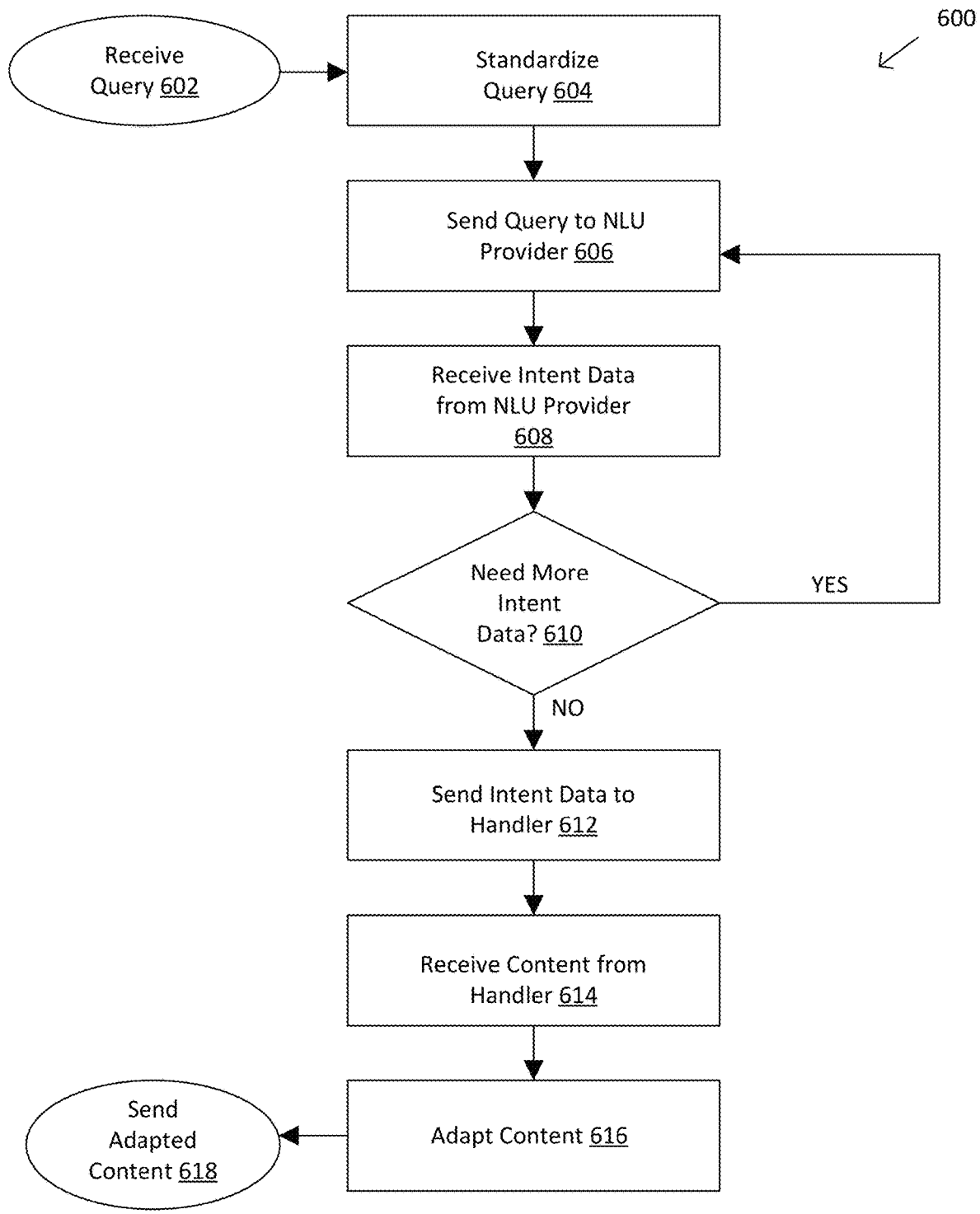
FIG. 6 is a flowchart illustrating an example of how the digital assistant platform responds to a query.

FIG. 6 is a flowchart of a method 600 of receiving, processing, and responding to a natural language query. The method 600 is usable by the digital assistant platform 108 described herein. In describing the method 600, reference is made to FIGS. 1-5 and FIG. 8.

In the example shown, the method 600 is instantiated by receiving a query (step 602). The digital assistant platform 108 can use the adapters 204 to receive the query. The query can be a natural language query, and it can be a voice-based query or a text-based query. The query can be sent by the user device 102. As illustrated in and described in connection with FIG. 3, the user device 102 can be a variety of devices.

In an online retail context, for example, the purpose of the natural language query can be anything related to a digital service offered by a retailer. For example, the natural language query can relate to a request to order a product, browse for a product, add a product to an online shopping cart, check the status of an order, inquire about a store's stock or hours, check the status of a shipment of an order, communicate information regarding an order pickup, provide feedback to the retailer, view account information, or any other reason that a customer may contact a retailer.

In the example shown, the digital assistant platform 108 can standardize the query (step 604). The digital assistant platform can use the adapters 204 to standardize the query. After a query is standardized, the digital assistant platform 108 can treat the query uniformly, irrespective of the whether the query is voice-based query or a text-based query, and irrespective of the device that sends the query. Referring now to FIG. 2, after the adapters 204 standardize the query, the adapters 204 can transmit the standardized query to the orchestrator 202.

In the example shown, the digital assistant platform 108 can transmit the standardized query to a NLU provider of the NLU providers 110*a-x* (step 606). To do so, the orchestrator 202 can pass the standardized query, along with other data, to the NLU provider selector 206. The NLU provider selector 206 can then select a NLU provider of the NLU providers 110a-x, and transmit the standardized query to that NLU provider.

One way for the NLU provider selector 206 to select a NLU provider of the NLU providers 110a-x is to use an intent space. An intent space is a logical group of intents. The intent space can be broad or narrow, depending, among other things, on the information already known about the user's session or on what information is still unknown. For an example in the retail context, at the start of a customer's session, the intent space may be broad, including, for example, broad possible intents such as "cancel order," "browse products," or "check account information." Or the intent space may be narrower. For example, if a broad intent of "store pickup" has already been determined, the intents in the intent space may include more narrow intents related to store pickup, such as "cancel store pickup," "arrival notification," or "change pickup time."

Accordingly, the orchestrator 202 can transmit, along with the standardized query and other data, an intent space to the NLU provider selector 206. In response to receiving the intent space, the standardized query, and other data, the NLU provider selector 206 can transmit the standardized query to an NLU provider that is associated with that intent space. The intent spaces, and the NLU providers that the intent spaces are associated with, can be stored in an NLU provider database 210, as described in connection with FIG. 2.

In the example shown, the digital assistant platform 108 can receive intent data from an NLU provider of the NLU providers 110a-x, as discussed above in relation to FIG. 4 (step 608). The intent data can be received at the NLU provider selector 206 and passed to the orchestrator 202.

Additionally, the digital assistant platform 108 can determine whether more intent data from the NLU providers 110a-x is needed (step 610). If yes, then the orchestrator 202 can transmit the intent data, the query, an intent space, and other information back to the NLU provider selector 206, and the method 600 returns to Step 606. If the digital assistant platform 108 determines that no more intent data is needed from the NLU providers 110a-x, then the method 600 proceeds to Step 612.

In examples, the digital assistant platform 108 can transmit the intent data to a handler of the handlers 112a-x (step 612). To do so, the orchestrator 202 can pass the intent data to the intent routers 208. The intent routers 208 can then read the intent of the intent data, determine which handler of handlers 112a-x is associated with that intent in the handler database 212, and transmit the intent data to that handler. As discussed in connection to FIG. 5, the digital assistant platform 108 can transmit more data than only the intent data to the handlers. For example, the digital assistant platform can transmit information related to previous intents, information related to previous queries, information related to previous content delivered to the user device 102, information associated with the user device 102, information related to the device type of the user device 102, and other information that can be used by the handlers 112a-x.

The digital assistant platform 108 can receive content from a handler of the handlers 112a-x (step 614). The digital assistant platform 108 can receive the content at the intent routers 208. The intent routers 208 can then pass the content to the orchestrator 202, which then passes the content to the adapters 204. An example of content is shown in FIG. 8 as example responsive content 810.

The digital assistant platform 108 can also adapt the content to fit the user device 102 (step 616). The digital assistant platform 108 can use the adapters 204 to adapt the content. For example, the adapters 204 can, if the user device 102 is a device without a display screen, adapt the content so that it provides voice-based responses and contains less information. As a further example, the adapters 204 can, if the user device is a device using a native mobile application, adapt the response to include both voice and text response, as well as a button for the user of the user device 102 to further interact with the digital assistant platform 108.

In examples, the digital assistant platform 108 can send the adapted content to the user device 102 (step 618). Although not illustrated in FIG. 6, after sending the adapted responsive content, the method 600 can begin again (at step 602) in response to receiving another query from the user device 102.

Although specific method steps are shown, the method 600 are not limited to the steps 602-618. For example, the method 600 can have more steps or less steps than those shown. Additionally, the ordering of the operations is not limited to the order illustrated in FIG. 6.

Figure 7:
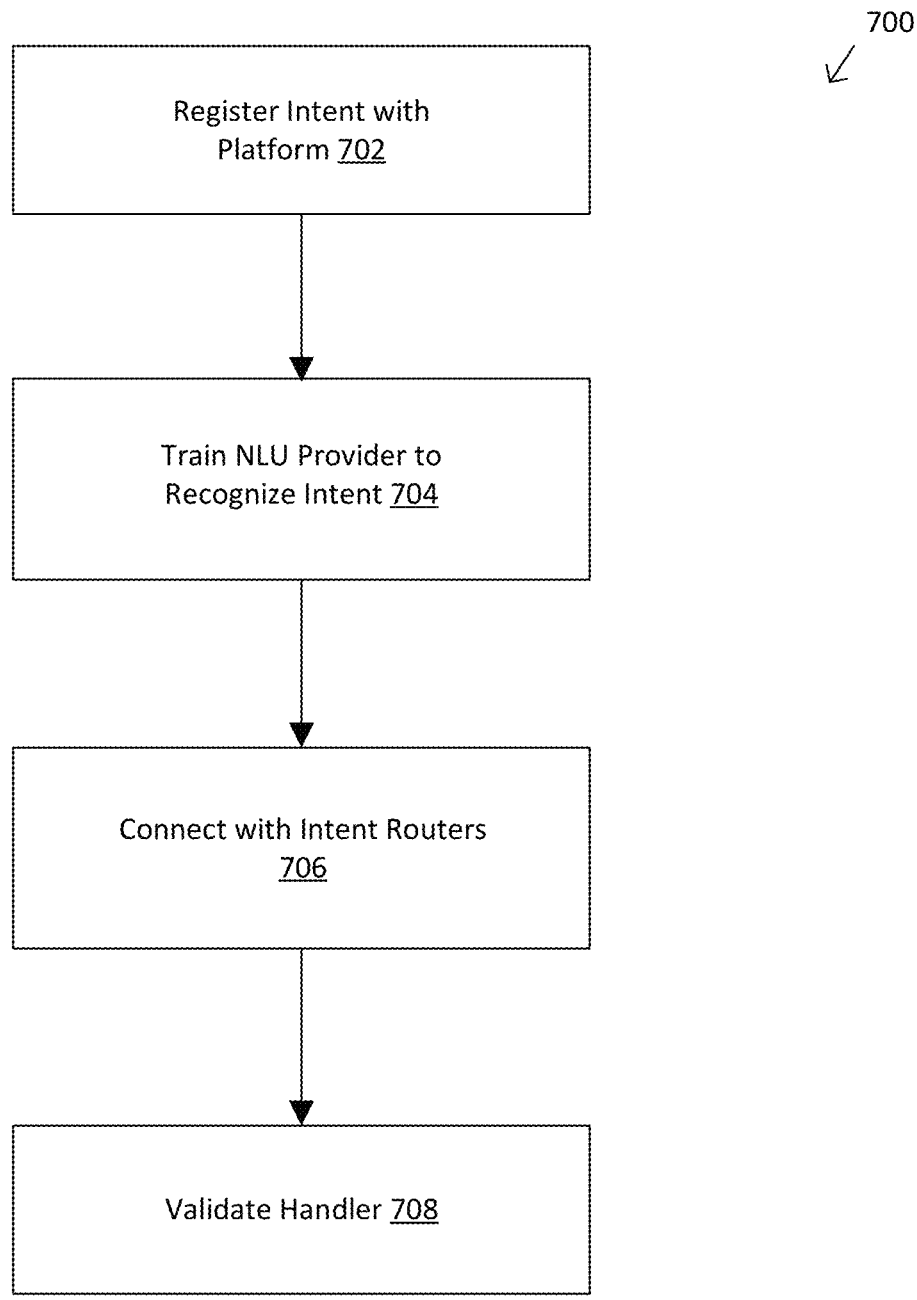
FIG. 7 is a flowchart illustrating an example of how a handler can connect to the digital assistant platform.

FIG. 7 is a flowchart of method 700 useable by the digital assistant platform 108. The method 700 relates to adding a new handler to the handlers 112a-x.

In the example shown, the digital assistant platform 108 can register intents associated with the new handler (step 702). These intents can be registered in the handler database 212. These intents, as described above in connection with FIG. 5, relate to the type of task that the new handler can perform. Once the new handler has registered these intents, the intent routers 208 can, upon recognizing that intent data includes one of these intents, transmit data to the new handler.

Still further, in the example shown the digital assistant platform 108 can train one or more NLU providers of the NLU providers 110a-x to recognize the intents registered (step 704). To do the training, the digital assistant platform 108 can provide training data that includes the intents and example natural language queries to the one or more NLU providers that are being trained. Following the training data, the digital assistant platform 108 can use second training data or validation data to further train the one or more NLU providers. After training the one or more NLU providers, the one or more NLU providers can return, in response to processing a natural language query, intent data that includes the one or more newly trained intents.

Additionally, the new handler can communicatively connect with the digital assistant platform 108 by, for example, communicatively connecting to the intent routers 208 (step 706).

In the example shown, the digital assistant platform 108 can validate the new handler (step 708). To do so, the digital assistant platform 108 can run tests that determine the effect of adding the new handler. For example, the digital assistant platform 108 can compare the accuracy of the NLU providers 110a-x, and the accuracy the digital assistant platform 108 more generally, after adding the new handler as compared to before adding the new handler.

For an example in the retail context, if the new handler is a "schedule grocery pickup handler," and the new handler naively registers the intent "browse kitchen products," then the new handler might take away some queries that should go to an already-existing product search handler. By doing so, the new handler might make the digital assistant platform worse than it was before, and if this is the case, the new handler might not be validated. In this and other ways, the new handler can be validated to assure that it does not worsen the efficiency, accuracy, or responsiveness of the digital assistant platform 108.

Referring to method 700 more generally, the steps of method 700 can be performed in various orders. Moreover, additional steps not illustrated can be added, and the steps illustrated can be removed.

FIG. 8 illustrates example data 800 that may be exchanged as part of a natural language query sequence. The example data 800 includes queries 802a-c, example intent data 804, and example responsive content 810. The example queries 802a-c can be voice-based queries or text-based queries, and they can be sent from the user device 102, which can be one of the devices 302-310. The example intent data 804 includes two fields: an intent field 806 and an entities field 808. Although only one intent is illustrated, the intent field 806 can include more than one intent. The entities field 808 can include any number of entities. The example responsive content 810 includes an example of possible information that can be returned by a handler of the handlers 112a-x. In one example, the example responsive content 810 can be structured in a standardized format, such that any responsive content received by the digital assistant platform 108 from any of the handlers 112a-x has a similar format, allowing the digital assistant platform 108 to receive and process responsive content in a standardized way.

An example use of the example data 800 can be illustrated with reference to the method 600 of FIG. 6. To start, one of the example queries 802a-c, such as the example query 802a, can be received (e.g., at step 602) by the digital assistant platform 108, which can use the adapters 204 to receive it. After standardizing the example query 802a (e.g., at step 604), the digital assistant platform 108 can send (e.g., at steps 606-610), the example query 802a and other data to one or more NLU providers of the NLU providers 110a-x, resulting in the structured example intent data 804. Then the digital assistant platform 108 (e.g., at Step 612) can then send the example intent data 804, as well as other intent data or other information, to a handler, of the handlers 112a-x, that is associated with the "product search" intent. In response (e.g., at step 614) the handler can return, and the digital assistant platform can receive, the example responsive content 810. The digital assistant platform 108 can then adapt (e.g., at step 616), using the adapters 204, the example responsive content 810. For example, if the user device is a smart device, then the adapters 204 can adapt the example responsive content 810 to comply with communication protocols of the smart device. The digital assistant platform 108 can then send (e.g., at step 618) the adapted responsive content to the user device.

Figure 9:
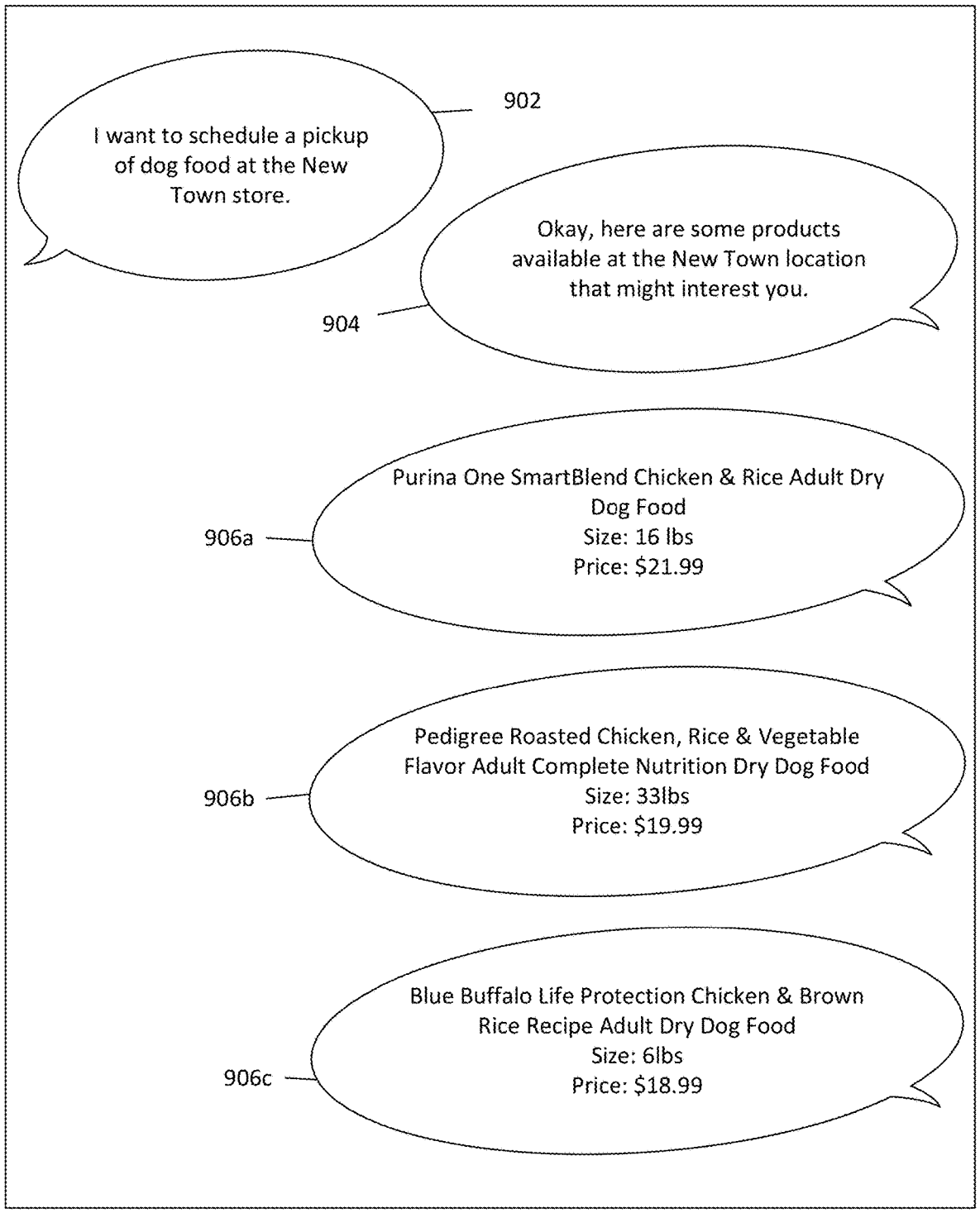
FIG. 9 illustrates an example of a possible interaction between a user and the digital assistant platform.
Figure 10:
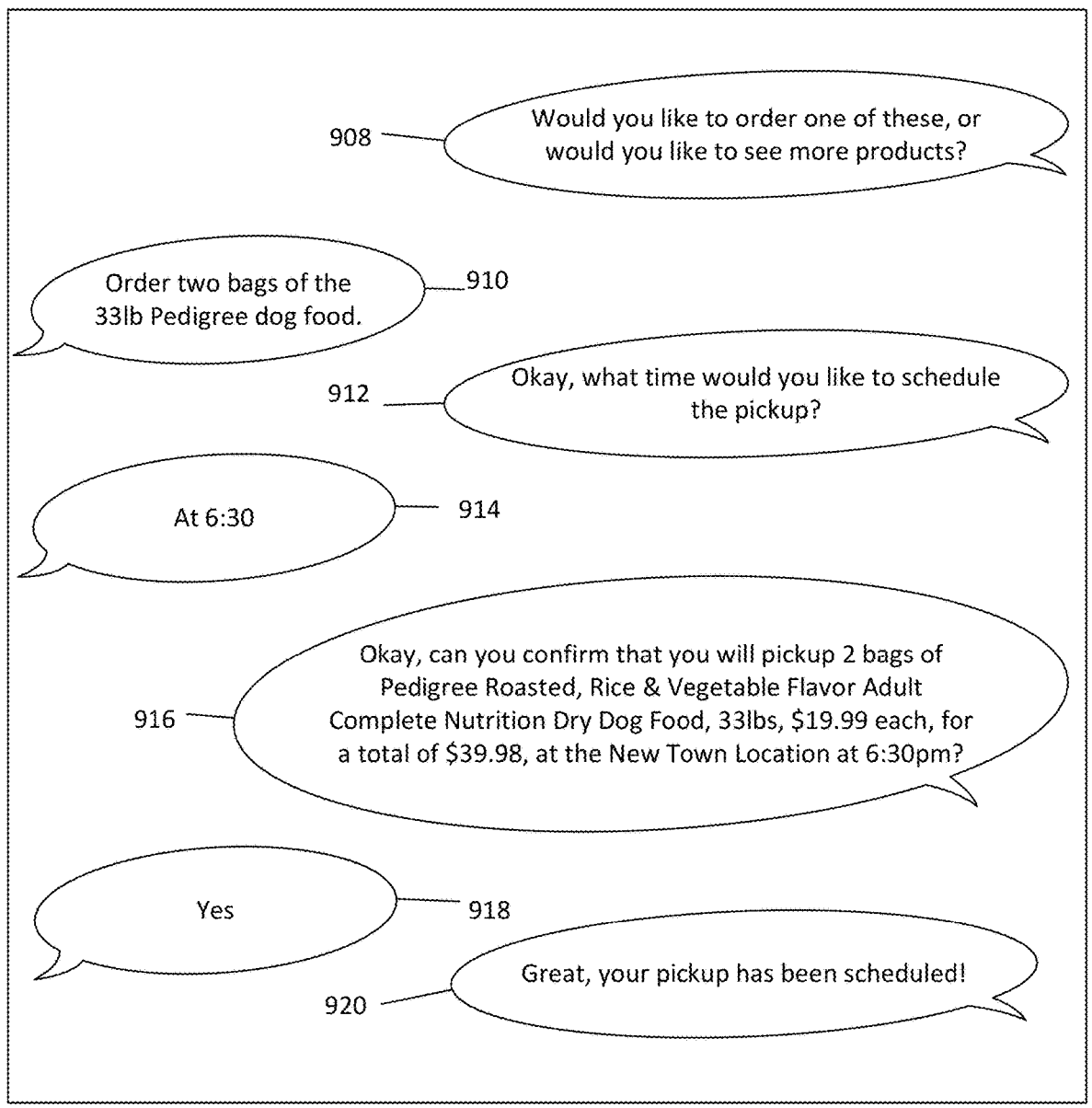
FIG. 10 is a continuation of the example interaction of FIG. 9.

FIG. 9 and FIG. 10 illustrate a user-platform interaction 900. The user-platform interaction 900 is an example interaction between the user device 102 and the digital assistant platform 108. The user-platform interaction 900 includes communications 902-920. The communications 902-920 include query 902, query 910, query 914, and query 918. The communications 902-920 also include content 904, content 906a-c, content 908, content 912, content 916, and content 920.

The user-platform interaction 900 can be a voiced-based interaction, a text-based interaction, a display-based interaction, or a combination thereof. Furthermore, the user-platform interaction 900 can include more communications than communications 902-920. Furthermore, one or more of the communications of the communications 902-920 do not need to be present in the user-platform interaction 900.

As an example, referring again to the method 600 of FIG. 6, the user-platform interaction 900 can be initiated by the digital assistant platform 108 receiving the query 902 (e.g., at step 602 of the method 600). In response to the query 902, the digital assistant platform can send (e.g., at step 618) the content 904-908. Before returning the content 904-908 (e.g., at step 618), the digital assistant platform 108 can perform one or more processing steps (e.g., steps 604-616).

In doing so, the digital assistant platform 108 can use one or more NLU providers of the NLU providers 110a-x. For example, the digital assistant platform 108 can first transmit the query 902 to NLU provider 110a, and the digital assistant platform 108 can receive intent data specifying that a general intent of the query 902 is to schedule a pickup; next, the digital assistant platform can transmit the query to NLU provider 110b, and the digital assistant platform 108 can receive intent data specifying that the intended store location is New Town, or that the intended product is dog food. Accordingly, within the same query sequence, different NLU providers may be used, while overall state of the queries from the user may be managed and tracked via the orchestrator 202. Additionally, the digital assistant platform 108 may manage state of queries from a given user, to ensure that, although different NLU providers are used, the overall response is contextually appropriate and carries correct information (e.g., the specific dog food that is selected by the user is maintained despite switching between NLU providers over the course of the sequence of queries and responses (e.g., to query items, select a particular item from an item catalog, schedule pickup/deliveries, etc.).

The digital assistant platform 108 can also use one or more handlers of the handlers 112a-x. The one or more handlers, which can include a schedule pickup handler, can return responsive content using the intent data returned from the NLU providers 110a-x based on the query 902. Once this responsive content is adapted by the adapters 204 to comply with protocols or any other requirements of the user device 102, it can be returned as the content 904-908.

Upon receiving the query 910, the digital assistant platform 108 can start the method 600 again (e.g., at step 602). Additionally, the digital assistant platform 108 can retain information related to the query 902 and the content 904-908. The digital assistant platform 108 can use such information in response to receiving query 910, query 914, and query 918.

Figure 11:
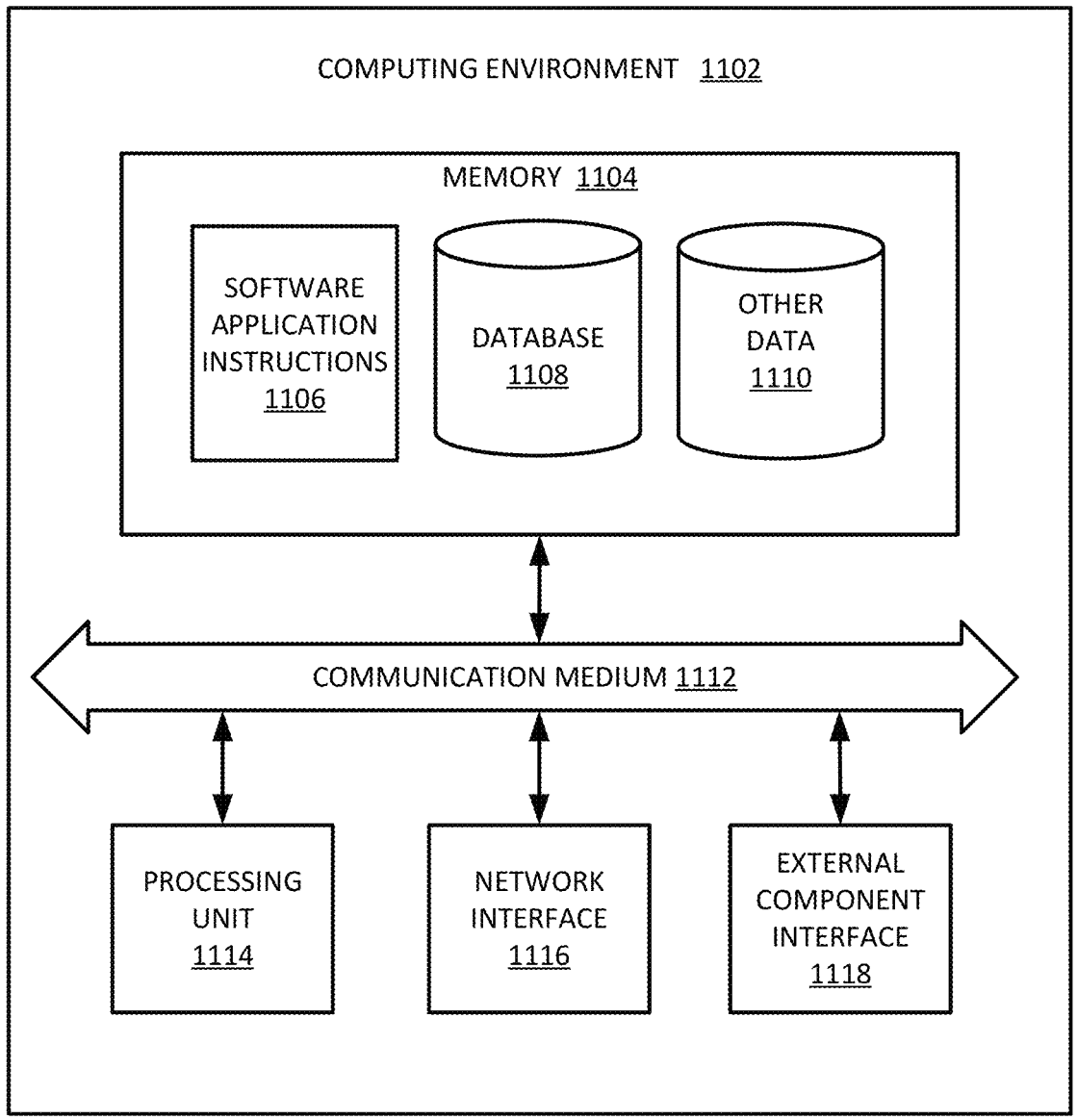
FIG. 11 illustrates an example block diagram of a computing system.

FIG. 11 illustrates an example system 1100 with which disclosed systems and methods can be used. In an example, the following can be implemented in one or more systems 1100 or in one or more systems having one or more components of system 1100: the user device 102, which can be, for example, the devices 302-310, the digital assistant platform 108, including, as described in connection with FIGS. 2, 3, 4, and 5, the components of the digital assistant platform 108, the NLU providers 110a-x, the handlers 112a-x, the NLU provider database 210, and the handler database 212.

In an example, the system 1100 can include a computing environment 1102. The computing environment 1102 can be a physical computing environment, a virtualized computing environment, or a combination thereof. The computing environment 1102 can include memory 1104, a communication medium 1112, one or more processing units 1114, a network interface 1116, and an external component interface 1118.

The memory 1104 can include a computer readable storage medium. The computer storage medium can be a device or article of manufacture that stores data and/or computer-executable instructions. The memory 1104 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1104 can store various types of data and software. For example, as illustrated, the memory 1104 includes software application instructions 1106, one or more databases 1108, as well as other data 1110. In some examples (e.g., where the computing environment 1102 is the user device 102), the memory 1104 can include instructions for accessing the digital assistant platform 108.

The communication medium 1112 can facilitate communication among the components of the computing environment 1102. In an example, the communication medium 1112 can facilitate communication among the memory 1104, the one or more processing units 1114, the network interface 1116, and the external component interface 1118. The communications medium 1112 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1114 can include physical or virtual units that selectively execute software instructions, such as the software application instructions 1106. In an example, the one or more processing units 1114 can be physical products comprising one or more integrated circuits. The one or more processing units 1114 can be implemented as one or more processing cores. In another example, one or more processing units 1114 are implemented as one or more separate microprocessors. In yet another example embodiment, the one or more processing units 1114 can include an application-specific integrated circuit (ASIC) that provides specific functionality. In yet another example, the one or more processing units 1114 provide specific functionality by using an ASIC and by executing computer-executable instructions.

The network interface 1116 enables the computing environment 1102 to send and receive data from a communication network (e.g., the networks 104a-c). The network interface 1116 can be implemented as an Ethernet interface, a token-ring network interface, a fiber optic network interface, a wireless network interface (e.g., Wi-Fi), or another type of network interface.

The external component interface 1118 enables the computing environment 1102 to communicate with external devices. For example, the external component interface 1118 can be a USB interface, Thunderbolt interface, a Lightning interface, a serial port interface, a parallel port interface, a PS/2 interface, or another type of interface that enables the computing environment 1102 to communicate with external devices. In various embodiments, the external component interface 1118 enables the computing environment 1102 to communicate with various external components, such as external storage devices, input devices, speakers, modems, media player docks, other computing devices, scanners, digital cameras, and fingerprint readers.

Although illustrated as being components of a single computing environment 1102, the components of the computing environment 1102 can be spread across multiple computing environments 1102. For example, one or more of instructions or data stored on the memory 1104 may be stored partially or entirely in a separate computing environment 1100 that is accessed over a network.

Depending on the size and scale of the computing environment 1102, it may be advantageous to include one or more load balancers to balance traffic across multiple physical or virtual machine nodes. In an example, the node balancer may be a node balancer product provided by F5 NETWORKS, INC. of Seattle, Washington.

Aspects of the platform 1100 and the computing environment 1102 can be protected using a robust security model. In an example, users may be made to sign into the system using a directory service, such as ACTIVE DIRECTORY by MICROSOFT CORPORATION of Redmond, Washington. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full platform 1100, such that portal can run and schedule jobs and serve the portal user interface as long as a single node remains functional. The environment 1102 may include monitoring technology to determine when a node is not functioning so an appropriate action can be taken.

Referring to FIGS. 1-11, it is noted that the extensible digital assistant platform described herein has a number of technical features that make it particularly advantageous over existing digital assistants. For example, the digital assistant platform can receive queries from a variety of devices using a variety of channels, and the digital assistant platform can provide a uniform experience across these devices and channels. Additionally, the digital assistant platform can leverage any and all NLU providers. Consequently, the digital assistant platform is not dependent on any one NLU provider, the digital assistant platform can leverage different NLU providers for different queries or to find different intents, and the digital assistant platform can expand to incorporate new NLU providers. Furthermore, the digital assistant platform can intelligently connect the variety of devices and NLU providers to an extensible set of handlers. The handlers can, for example, offer all the services required from a digital assistant in the retail space. Moreover, the digital assistant platform can seamlessly connect with more or less handlers as is required by technical or business needs. Putting all this together, the digital assistant platform described herein provides an integrated and flexible natural-language-processing digital assistant that provides content that is responsive to user intent.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A digital assistant platform comprising:
a processing unit;
a memory communicatively connected to the processing unit, the memory storing instructions executable by the processing unit wherein the instructions, when executed, cause the digital assistant platform to:
receive a query from a user device;
transform, using an adapter, the query into a standardized query;
transmit the standardized query to a natural language understanding service for submission to at least one of a plurality of natural language understanding providers;
receive intent data from the natural language understanding service, the intent data being provided by a selected natural language understanding provider of the plurality of natural language understanding providers;
transmit the intent data to a handler selected from among a plurality of handlers, wherein each of the plurality of handlers, before being added to the plurality of handlers, is validated by the digital assistant platform, wherein validating a new handler includes determining the performance of the digital assistant platform before adding the new handler, determining the performance of the digital assistant platform after adding the new handler, and determining that adding the new handler to the plurality of handler does not worsen the performance of the digital assistant platform;
receive responsive content from the selected handler, wherein the responsive content is in a standardized format;
transmit the responsive content to the adapter;
transform the responsive content, using the adapter, to adapted responsive content, wherein the adapted responsive content is automatically transformed from the standardized format to a format that is compatible with a device type associated with the user device;
transmit the adapted responsive content to the user device.

2. The digital assistant platform of claim 1,
wherein the natural language understanding service comprises a natural language understanding provider selector communicatively connected to the plurality of natural language understanding providers; and
wherein transmitting the standardized query to the natural language understanding service for submission to the at least one of the plurality of natural language understanding providers is performed by:
transmitting the standardized query to the natural language understanding provider selector;
selecting, using the natural language understanding provider selector, the selected natural language understanding provider from the plurality of natural language understanding providers; and
transmitting the standardized query to the selected natural language understanding provider.

3. The digital assistant platform of claim 2,
wherein transmitting the standardized query to the natural language understanding provider selector further comprises transmitting a relevant intent space to the natural language understanding provider selector;
wherein the memory further stores a natural language understanding provider database, the natural language understanding provider database providing a matched natural language understanding provider for each intent space of a plurality of intent spaces; and
wherein selecting, using the natural language understanding provider selector, the selected natural language understanding provider from the plurality of natural language understanding providers is performed by selecting, using the natural language understanding provider database, the matched natural language understanding provider for the relevant intent space.

4. The digital assistant platform of claim 3, wherein the plurality of natural language understanding providers are trained to return intent data related to retail.

5. The digital assistant platform of claim 2,
wherein the instructions, when executed, further cause the digital assistant platform to extend the natural language understanding service, wherein extending the natural language understanding service is performed by:
communicatively connecting the natural language understanding provider selector to a new natural language understanding provider.

6. The digital assistant platform of claim 2,
wherein the instructions, when executed, further cause the digital assistant platform to contract the natural language understanding service, wherein contracting the natural language understanding service is performed by:
communicatively disconnecting the natural language understanding provider selector from one or more natural language understanding providers from the plurality of natural language understanding providers.

7. The digital assistant platform of claim 1,
wherein the intent data comprises an intent of a plurality of possible intents;
wherein the memory further stores a handler database, the handler database providing, for each intent of the plurality of possible intents, a matched handler of the plurality of handlers; and
wherein transmitting the intent data to the selected handler from among the plurality of handlers is performed by:
transmitting the intent data to intent routers, the intent routers having access to the handler database;
selecting, using the handler database, the matched handler for the intent of the intent data; and
transmitting the intent data to the matched handler.

8. The digital assistant platform of claim 7, wherein transmitting the intent data to the matched handler further comprises transmitting additional session data to the matched handler, the additional session data including one or more of:
information related to the user device;
previous intents; and
previous responsive content.

9. The digital assistant platform of claim 7,
wherein the instructions, when executed, further cause the digital assistant platform to add the new handler, wherein adding the new handler is performed by:
registering a new intent, the new intent corresponding with the new handler in the handler database; and
communicatively connecting the new handler to the intent routers.

10. The digital assistant platform of claim 9, wherein adding a new handler further comprises using the new intent and an example query to train at least one of the natural language understanding providers of the plurality of natural language understanding providers.

11. The digital assistant platform of claim 1,
wherein the instructions, when executed, further cause the digital assistant platform to, in response to receiving the intent data from the natural language understanding service, request additional intent data, wherein requesting additional intent data comprises:
transmitting expanded query information to the natural language understanding service for submission to the at least one of the natural language understanding providers of the plurality of natural language understanding providers; and
receiving additional intent data from the natural language understanding service, the additional intent data being provided by a second selected natural language understanding provider of the plurality of natural language understanding providers;
wherein the expanded query information includes one or more of: the standardized query; the intent data; a new intent space; and information related to the user device.

12. The digital assistant platform of claim 1 wherein the adapted responsive content includes one or more of: a voice response; a text response; product information; a photograph; and a video.

13. The digital assistant platform of claim 1, wherein the adapted responsive content relates to one or more of: browsing products; ordering products; viewing product orders; viewing a product shipment status; checking a product stock of a retail store; checking a store time of the retail store; scheduling a product pickup; cancelling an order; sending a gift; and other digital retail services.

14. The digital assistant platform of claim 1, wherein the user device is one or more of: a device using a website; a device using a mobile application; a device using a chat bot; and a smart device.

15. The digital assistant platform of claim 1, wherein the query is a voice-based query.

16. A method of operating a digital assistant platform, the method comprising:
receiving a query from a user device;
transforming, using an adapter, the query into a standardized query;
transmitting the standardized query to a natural language understanding service for submission to at least one of a plurality of natural language understanding providers;
receiving intent data from the natural language understanding service, the intent data being provided by a selected natural language understanding provider of the plurality of natural language understanding providers;
transmitting the intent data to a handler selected from among a plurality of handlers, wherein each of the plurality of handlers, before being added to the plurality of handlers, is validated by the digital assistant platform, wherein validating a new handler includes determining the performance of the digital assistant platform before adding the new handler, determining the performance of the digital assistant platform after adding the new handler, and determining that adding the new handler to the plurality of handler does not worsen the performance of the digital assistant platform;
receiving responsive content from the selected handler, wherein the responsive content is in a standardized format;
transmitting the responsive content to the adapter;
transforming the responsive content, using the adapter, to adapted responsive content, wherein the adapted responsive content is automatically transformed from the standardized format to a format that is compatible with a device type associated with the user device;
transmitting the adapted responsive content to the user device.

17. The method of claim 16, wherein transmitting the standardized query to the natural language understanding service for submission to the at least one of the plurality of natural language understanding providers is performed by:
transmitting the standardized query to a natural language understanding provider selector;
selecting, using the natural language understanding provider selector, the selected natural language understanding provider from the plurality of natural language understanding providers; and
transmitting the standardized query to the selected natural language understanding provider.

18. The method of claim 16, wherein transmitting the intent data to the handler selected from among the plurality of handlers is performed by:
transmitting the intent data to intent routers;
selecting, using a handler database communicatively connected to the intent routers, the selected handler; and
transmitting the intent data to the selected handler.

19. A digital assistant system comprising:
a plurality of adapters configured to receive a query from a user device and to standardize the query;
a natural language understanding service configured to provide structured intent data, wherein the natural language understanding service comprises a natural language understanding provider selector communicatively coupled with a plurality of natural language understanding providers;
a plurality of handlers, wherein each of the plurality of handlers, before being added to the plurality of handlers, is validated, wherein validating a new handler includes determining the performance of the digital assistant system before adding the new handler, determining the performance of the digital assistant system after adding the new handler, and determining that adding the new handler to the plurality of handler does not worsen the performance of the digital assistant system; and an orchestrator communicatively connected to the plurality of adapters, to the natural language understanding service, and to the plurality of handlers;
wherein the orchestrator is configured to:
   receive a standardized query;
   transmit the standardized query to the natural language understanding service;
   receive intent data from the natural language understanding service;
   transmit the intent data, via intent routers, to a selected handler of the plurality of handlers;
   receive responsive content, via the intent routers, from the selected handler; and
   transmit the responsive content to at least one of the adapters of the plurality of adapters, wherein the at least one of the adapters transforms the responsive content from a standardized format to a format that is compatible with a device type associated with the user device.

* * * * *